(No Model.)
E. BROWN.
Pyrometer.
No. 234,169. Patented Nov. 9, 1880.
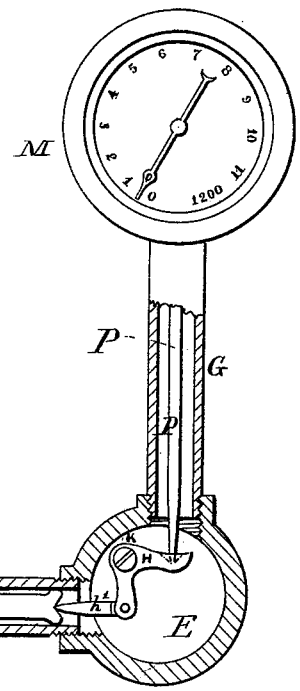
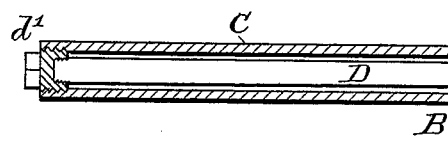
Fig.1
Fig.2
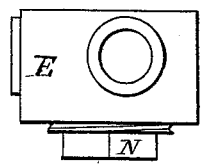
Witnesses
D. Louis Shivers
John F. Grant
Inventor
Edw. Brown

UNITED STATES PATENT OFFICE.

EDWARD BROWN, OF PHILADELPHIA, PENNSYLVANIA.

PYROMETER.

SPECIFICATION forming part of Letters Patent No. 234,169, dated November 9, 1880.

Application filed May 6, 1880. (No model.)

*To all whom it may concern:*

Be it known that I, EDWARD BROWN, of Philadelphia, Pennsylvania, have invented a new and useful Pyrometer for Indicating the Temperature of Shallow Liquids, of which the following is a specification.

When the depth of the liquid or melted metal is only one or two inches and there is no facility for inserting the usual Gauntlett pyrometer through the side of the vessel, it is impossible to obtain the temperature accurately with any pyrometer now in use.

My present invention overcomes this difficulty.

It consists in combining the usual expansion-stem of the pyrometer with an angle-box having a suitable interior mechanism, whereby the differential motion is communicated to the pointer of the instrument at an angle with the expansion-stem.

Figure 1 is a sectional elevation. Fig. 2 is a plan of the angle-box.

B is the expansion-stem of the instrument, as heretofore usually made, having an outside tube, C, and an inside rod, D. These are secured together at the end $d'$, and are free to move at the opposite end.

E is an angle-box, into one side of which the pipe C is screwed, and at right angles or at some other convenient angle to it the tube G, carrying the head M, enters, and is screwed to it in a similar manner.

H is a bell-crank, turning on a stud, K, screwed to the angle-box.

At one end a hinged pin, $h'$, bears against the end of the rod D. The other end is countersunk and supports a connecting-pin, P, by which means the differential motion of the parts of the stem is communicated to the pointer in the head M.

The mechanism within the head M needs no further description. It is shown in my patent of August, 1872.

The instrument having been put together, as shown in Fig. 1, the lid N of the box is then screwed in steam-tight, and the instrument is complete.

By this construction an expansion-stem twelve or eighteen inches long may be used in a bath of melted tin one or two inches deep and an accurate indication of the temperature obtained.

I claim—

In a pyrometer, the combination of a differential expansion-stem, B, and an angle-box, E, containing mechanism for conveying the motion of the stem to the connecting-rod P at an angle with the stem, as herein described.

EDWD. BROWN.

Witnesses:
JOHN F. GRANT,
D. LOUIS SHIVERS.